United States Patent [19]

Jackson

[11] Patent Number: 4,886,110

[45] Date of Patent: Dec. 12, 1989

[54] HVAC ZONE CONTROL SYSTEM

[75] Inventor: Ronald E. Jackson, Indianapolis, Ind.

[73] Assignee: Valera Electronics Inc., Ontario, Canada

[21] Appl. No.: 157,727

[22] Filed: Feb. 22, 1988

[51] Int. Cl.⁴ .................. F24F 3/048; F25B 29/00
[52] U.S. Cl. .................................. 165/22; 165/27; 165/25; 236/1 B; 236/1 C; 236/68 B; 236/1 EB; 236/49.1
[58] Field of Search ............... 236/1 EA, 1 ER, 1 B, 236/1 C, 49, 68 B; 165/22, 27, 25; 307/39

[56] References Cited

U.S. PATENT DOCUMENTS

| | | |
|---|---|---|
| 3,116,786 | 1/1964 | Menditch . |
| 3,171,019 | 2/1965 | Riddel . |
| 3,243,553 | 3/1966 | Doyle . |
| 3,297,250 | 1/1967 | Capps .................................. 236/1 C |
| 3,306,348 | 2/1967 | Tucker . |
| 3,482,623 | 12/1969 | Betz ...................................... 165/22 |
| 3,677,335 | 7/1972 | Weatherston . |
| 3,724,534 | 4/1973 | Weatherston . |
| 3,785,432 | 1/1974 | Kabat et al. .......................... 236/1 C |
| 3,814,173 | 6/1974 | Coon . |
| 3,838,733 | 10/1974 | Erlandson . |
| 3,933,197 | 1/1976 | Zimmer et al. . |
| 3,934,797 | 1/1976 | Perlmutter .......................... 236/1 B |
| 3,949,807 | 4/1976 | Tyler . |
| 3,979,060 | 9/1976 | Tierce .................................. 165/12 |
| 4,009,825 | 3/1977 | Coon . |
| 4,013,118 | 3/1977 | Zimmer et al. . |
| 4,205,782 | 6/1980 | Cannella . |
| 4,237,966 | 12/1980 | Tomlinson . |
| 4,328,528 | 5/1982 | Kompelien . |
| 4,335,848 | 6/1982 | Eidejus ................................ 165/22 |
| 4,355,760 | 10/1982 | Ruby . |
| 4,530,395 | 7/1985 | Parker et al. ........................ 236/1 C |
| 4,533,080 | 8/1985 | Clark et al. . |

FOREIGN PATENT DOCUMENTS

| | | |
|---|---|---|
| 746577 | 11/1966 | Canada . |
| 902918 | 6/1972 | Canada . |
| 1030247 | 4/1978 | Canada . |
| 1037588 | 8/1978 | Canada . |
| 1145012 | 4/1983 | Canada . |
| 1164970 | 4/1984 | Canada . |
| 1167134 | 5/1984 | Canada . |
| 1177935 | 11/1984 | Canada . |
| 1187966 | 5/1985 | Canada . |
| 1213957 | 11/1986 | Canada . |
| 1218438 | 2/1987 | Canada . |
| 0143640 | 7/1986 | Japan ................................... 165/22 |

Primary Examiner—John Ford
Attorney, Agent, or Firm—Wenderoth, Lind & Ponack

[57] ABSTRACT

An HVAC system for a plurality of zones comprising an air handling unit including a blower, a plurality of heating stages and a plurality of cooling stages. The air handling unit is connected via ducts to each of the zones, each zone having an air outlet provided with a two-position damper which is either open or closed and a thermostat for providing an input signal to a microprocessor. The microprocessor has outputs for activating motors to move the dampers and outputs for activating the heating and cooling stages. The system includes an automatic mode of operation in which the microprocessor controls the number of stages of heating or cooling which are energized in dependence on the difference between the number of zone therostats calling for heating and the number of zone thermostats calling for cooling.

5 Claims, 2 Drawing Sheets

HVAC ZONE CONTROL SYSTEM

BACKGROUND OF THE INVENTION

This invention, relates to a heating, ventilating, air conditioning (HVAC) system and in particular to an HVAC system having a plurality of zones supplied by air handling equipment (as opposed to systems using hot/cold water or electric baseboard heaters, for example).

It is known to use a single heating and/or cooling unit to supply a plurality of zones in a building. Each zone may be provided with a thermostat and a motor driven damper. A control system monitors the thermostats and controls the various dampers and the heating and cooling units. A variety of different systems are known in the prior art.

For example, in the system according to the Clark, et al U.S. Pat. No. 4,533,090, fan volume control is achieved as a result of temperature sensing using a plurality of sensors. Binary signals from thermostatic transducers indicate if zones ("terminals") are satisfied or not. Transducer signals are fed to a controller which acts to increase, decrease, or maintain fan speed.

The Weatherston U.S. Pat. No. 3,677,335 discloses a staged heating and cooling system. Thermostat signals are clocked at intervals, e.g. two minutes, to a binary up-down counter, the output of which is decoded to feed different amounts of current to progressively open or close a valve for heating or, for cooling, operate a modulating motor which can open dampers to allow cooling air to be brought into the building and, if a lot of cooling is called for, turn on refrigeration units.

The Coon U.S. Pat. No. 3,814,173 discloses a system in which an air fan associated with a furnace or cooling coils has its speed changed by digital increments in response to the total demand heat heated air or cooled air, as sensed by the individual thermostats.

U.S. Pat. No. 3,724,534 of Weatherston discloses a multiple zone control system with priority of service. The system may have 16 zones or more. Signals from thermostats are scanned and summed to see whether, over a given time period, the net change from all zones is toward more cooling air or more heating. A thermostat can be connected to more than one scanner input to give it more "weight".

SUMMARY OF THE INVENTION

The present invention provides an HVAC system with a unique combination of features resulting in a system which effectively and efficiently provides heating and cooling of a plurality of zones from a single heating/cooling unit. An important feature of the invention is that, in automatic mode, the number of stages of heating or cooling which are energized depends on the difference between the number of zones calling for heating and those calling for cooling. Each zone is controlled by its own space thermostat and motorized damper. All zone dampers remain open to circulate air until the difference between the number of zones calling for heating and those calling for cooling reaches a preset number, which number is adjustable, thus bringing on the first stage of heating or cooling. The actual number difference between zones calling for heating and those calling for cooling determines the correct number of stages of heating, cooling or economizer to be energized.

The system can operate in automatic, heating or cooling mode, depending on the position of a selector switch.

In the heating mode, all zone dampers remain open to circulate air until a sufficient number of zone thermostats (number is adjustable) signal the microprocessor to energize the first stage of heating. The dampers of the zones that are calling for heating will remain open while all other dampers will be driven closed. If a number of additional zones (number is adjustable) should call for heating, the second stage of heating will be cycled on as required. When a sufficient number of stages of heating have cycled off, all zone dampers are returned to the open position.

The cooling sequence is the same as the heating sequence.

The system can be provided with a number of other features as well. For example, a 7 day program clock can be provided to determine the occupied/unoccupied cycles. Fan operation is then constant during the occupied cycle and intermittent during the unoccupied cycle. During the unoccupied cycle, the outside air damper will be fully closed. The occupied/unoccupied thermostats will cycle the system to maintain a reduced temperature in the heating mode and maintain an increased space temperature in the cooling mode. A 6 hour hand wound timer to override the 7 day clock can be provided if desired.

At the end of the unoccupied cycle, the outdoor air damper can be held closed until an optional warm up thermostat, located in the return air duct, is satisfied.

Auxiliary heating may also be provided for some or all zones. A zone thermostat can energize the auxiliary heating only in the occupied cycle and only if the system is not operating in the heating mode. In other words, the auxiliary heating is locked out if primary heating is on.

A weighting circuit can be provided to allow a zone thermostat to have additional influence on a call for heating or cooling, such as might be required in a conference room. The zone thermostat can be programmed for a weight, or priority, of up to three, giving the zone thermostat up to three times the normal influence on the system.

The system uses two-position dampers (either fully open or fully closed) rather than modulated dampers. It has been found that the system provides close temperature control and a fully open damper ensures good air flow through diffusers provided at the air outlets. This is because conventional diffusers are designed to work at a fixed air flow rate (CFM) and therefore work best when used in conjunction with two position control dampers.

The thermostats provide signals as inputs to a microprocessor located in a master control panel. The microprocessor provides outputs to control the heating and cooling stages, air blower and dampers. If there is no call for heating or cooling by any zone thermostat, all zone dampers are allowed to go to their full open position to provide ventilation. The dampers are spring biased towards their open positions and are motor driven to their closed positions.

The system is designed to use electromechanical thermostats which include resistors known as "anticipators". These anticipator resistors are provided with electrical current so that the bimetallic sensing element of the thermostat can keep up to the rate of increasing temperature in a zone being heated. It is known to provide current to a heat anticipator resistor by connecting it in series with the coil of a relay having contacts used to control a heating source, e.g. an electric heater, gas furnace or oil furnace. In the present invention, however, the thermostats are not connected to relay coils but to a master control panel which includes a central processing unit (and related logic circuitry) for controlling the relays which activate the heating and cooling devices. Each thermostat requires a minimum of 0.1 Amp. of current flow in the heat anticipator circuit. This could be done by connecting each anticipator in series with a resistor in the master control panel, but such a resistor would generate heat. With, say, 18 zones, each having a thermostat, 18 resistors would be required. These resistors would generate heat which could adversely affect the electronic circuitry such as the microprocessor, in the control panel. The present invention avoids this heating problem by connecting the anticipator in series with a capacitor. The current through the capacitor is out of phase with the voltage across it so that it does not generate heat. At the same time, the capacitor prevents excessive current from flowing through the heat anticipator.

BRIEF DESCRIPTION OF THE DRAWING

A preferred embodiment of the invention will now be described in conjunction with the accompanying drawings, in which.

DESCRIPTION OF THE PREFERRED EMBODIMENTS

Figure 1:
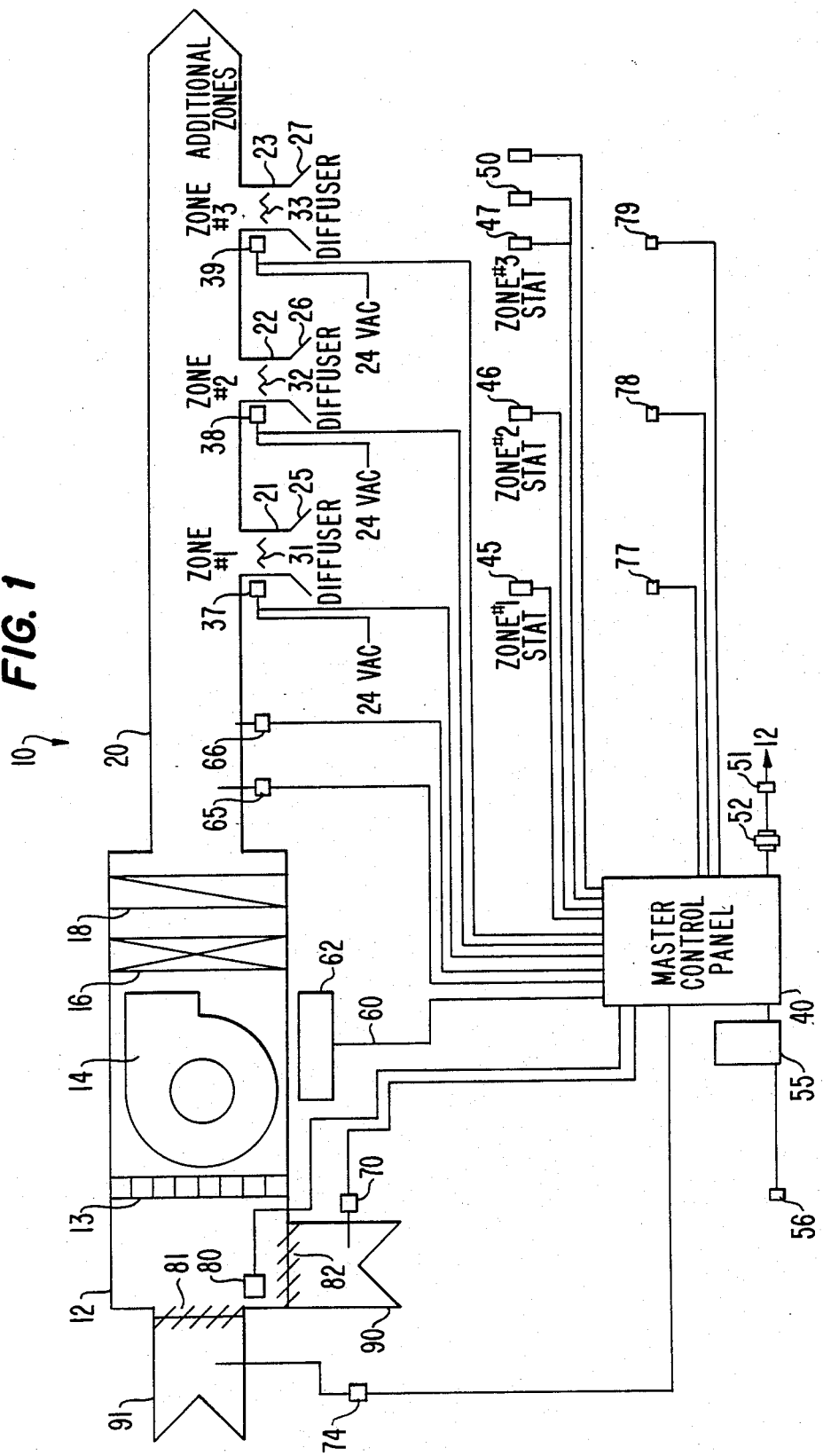
FIG. 1 is a schematic illustration of an HVAC system according to the invention.

Referring to FIG. 1, an HVAC system according to the invention is generally indicated at 10. It includes an air handling unit 12 in which is disposed a filter 13, blower 14, three stage heating unit 16 and three stage cooling unit 18. An output duct 20 supplies air to a plurality of zone outlets, e.g. as many as eighteen, only three of which are shown at 21, 22 and 23. The zone outlets 21, 22 and 23 include diffusers 25, 26, 27 and dampers 31, 32, 33 which are adapted to be driven open by damper motors 37, 38 and 39, respectively. The damper motors are connected to 24 VAC and to relays (not shown) in the master control panel 40. The master control panel contains logic circuitry including a microprocessor for activating the relays to power the damper motors.

Zones 1 to 3 are provided with thermostats 45, 46, 47 which provide inputs to the microprocessor in control panel 40. A changeover switch 50 is connected to the microprocessor to select the three operational modes, i.e. heating, cooling and automatic.

Electrical power for the control panel 40 may be derived from 120 VAC, the current being fed through a fuse and switch box 51 and a control transformer 52. The size of the transformer depends on the number of zones to be controlled. For example, for 10 zones it could be a 40 VA transformer whereas for 18 zones it could be a 75 VA transformer.

The control panel may also receive an input from a 7-day clock 55 (optional) to control the occupied and unoccupied cycles. An override timer 56 may also be provided, it allowing the system to be forced into occupied cycle for a set time, e.g. 6 hours.

Shown for simplicity as a single line 60 is an output to an HVAC unit panel 62. Actually line 60 contains several lines for connection to the blower and the various stages of heating and cooling. The microprocessor in control panel 40 controls these via line 60.

For safety reasons, and as is well known, the system includes a cooling low limit thermostat 65 and an air proving switch 66, each providing inputs to the microprocessor. A warm-up thermostat may also be used and connected as another input to the microprocessor. Another optional input is a reset control 74. Optional outputs may be provided to auxiliary heat junction boxes 77, 78, 79 for zones 1, 2 and 3 and to other junction boxes for the other zones (not shown).

The microprocessor provides an output to control economizer motor 80 which regulates the positions of vanes 81, 82 to control the relative amounts of return air through duct 90 and outside air through duct 91 flowing to the air handling unit 12.

The logic circuitry in control panel 40 includes a ROM or PROM comprising firmware by which the microprocessor controls the system in the manner described previously.

Figure 2:
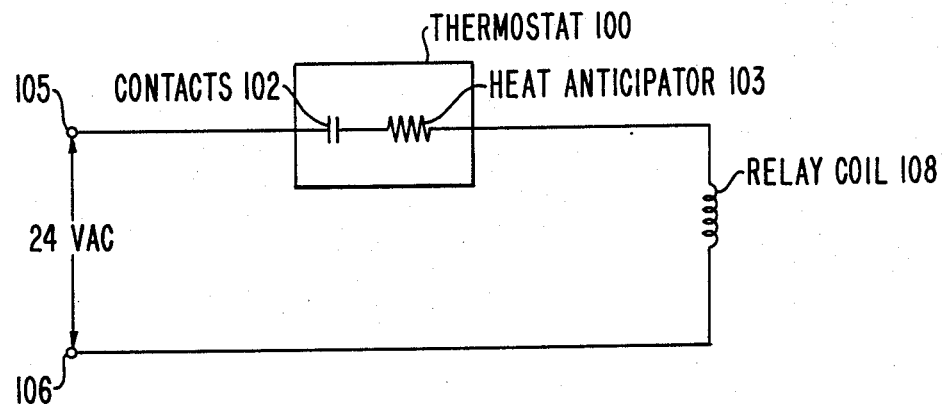
FIG. 2 is a schematic diagram illustrating a prior art arrangement for feeding current to a heat anticipator resistor.

FIG. 2 illustrates a prior art arrangement for providing current to a heat anticipator resistor 103 in a thermostat 100. When the contacts 102 in thermostat 100 close (because of the action of a bimetallic strip, not shown), current flows from the 24 VAC source connected to terminals 105, 106 through the closed contacts, anticipator 103 and relay coil 108. The impedance of the relay coil limits the amplitude of the current through the anticipator to an acceptable level. The relay coil actuates contacts, not shown which turn on a gas valve, oil burner or electric heater.

Figure 3:
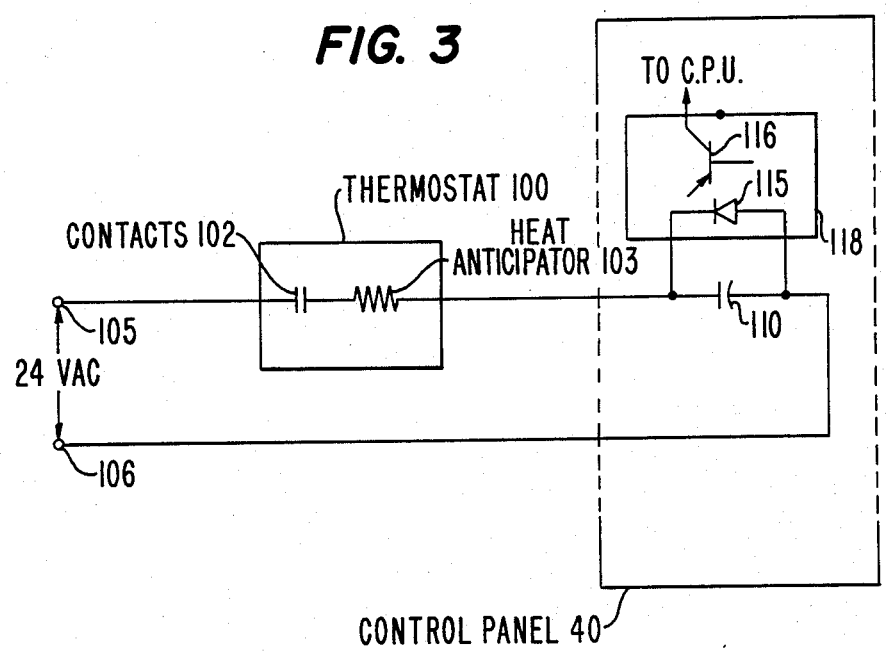
FIG. 3 is a schematic illustration of an arrangement according to the invention for feeding current to a heat anticipator resistor.

In the present invention, the thermostats are not connected to relay coils, rather they are connected to input terminals on the master control panel. This is illustrated in FIG. 3 which shows the thermostat 100 connected in series with a capacitor 110 inside control panel 40. Capacitor 110 limits the current through anticipator 103 to an acceptable value but does not generate heat inside the control panel, as would a current limiting resistor. This is because, as is known, the voltage across a capacitor is out of phase with the current through it.

In the system according to the present invention, an LED 115, comprising part of an opto-isolator 118, is connected in parallel with capacitor 110. When the contacts 102 of thermostat 100 close, some current flows through LED 115 which emits light to turn on transistor 116. Transistor 116 provides a signal to the microprocessor that the thermostat's contacts are closed.

It will be appreciated that various modifications may be made to the system herein disclosed without departing from the scope of the appended claims:

What is claimed is:

1. An HVAC system for a plurality of zones comprising an air handling unit including a blower, a plurality of heating stages and a plurality of cooling stages, said unit being connected via ducts to each of said zones, each zone having an air outlet provided with a two-position damper which is either open or closed and a thermostat for providing an input signal to a microprocessor, said microprocessor having a plurality of output means connected to activating motors to move said dampers and a plurality of output means for activating said heating and cooling stages, said system including an automatic mode of operation in which the microprocessor activates said heating stages of said cooling stages and controls the number of stages of heating or cooling which are energized in dependence on the difference between the number of zones thermostats calling for heating and the number of zone thermostats calling for cooling equalling or exceeding a predetermined number.

2. A system as claimed in claim 1 wherein the dampers for all zones are open unless at least one stage of heating or cooling is activated.

3. A system as claimed in claim 2 wherein, during heating, the dampers of the zone calling for heating are open while the dampers for all other zones are closed.

4. A system as claimed in claim 3 wherein, during cooling, the dampers of the zones calling for cooling are open while the dampers for all other zones are closed.

5. A system as claimed in claim 4 and further comprising a 7-day clock connected to said microprocessor for controlling operation of the system during an occupied mode in which operation of said blower is constant and an unoccupied mode in which operation of said blower is intermittent.

* * * * *